United States Patent
Goda et al.

(10) Patent No.: US 8,028,782 B2
(45) Date of Patent: Oct. 4, 2011

(54) HOOD STRUCTURE FOR VEHICLE

(75) Inventors: Naoki Goda, Kariya (JP); Keiichi Uchino, Kariya (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 224 days.

(21) Appl. No.: 12/516,255

(22) PCT Filed: Jul. 13, 2007

(86) PCT No.: PCT/JP2007/063982
§ 371 (c)(1),
(2), (4) Date: May 26, 2009

(87) PCT Pub. No.: WO2008/136136
PCT Pub. Date: Nov. 13, 2008

(65) Prior Publication Data
US 2010/0066127 A1  Mar. 18, 2010

(30) Foreign Application Priority Data
Apr. 26, 2007  (JP) .................. 2007-117466

(51) Int. Cl.
*B60K 13/02*  (2006.01)
*B62D 25/10*  (2006.01)
(52) U.S. Cl. .................. 180/69.2; 180/68.3; 180/69.22; 296/193.11
(58) Field of Classification Search .................. 180/68.3, 180/69.2, 69.21, 69.22, 69.24; 296/193.11
See application file for complete search history.

(56) References Cited

U.S. PATENT DOCUMENTS

| | | | | |
|---|---|---|---|---|
| 3,800,910 A | * | 4/1974 | Rose | 181/229 |
| 4,646,864 A | | 3/1987 | Racchi | |
| 4,778,029 A | * | 10/1988 | Thornburgh | 181/229 |
| 5,706,908 A | * | 1/1998 | Sakai et al. | 180/69.2 |
| 5,744,763 A | * | 4/1998 | Iwasa et al. | 181/286 |
| 6,056,075 A | * | 5/2000 | Kargilis | 180/68.1 |
| 7,150,496 B2 | * | 12/2006 | Fujimoto | 296/187.04 |
| 7,810,877 B2 | * | 10/2010 | Ishitobi | 296/193.11 |
| 2006/0048986 A1 | | 3/2006 | Bracciano | |

FOREIGN PATENT DOCUMENTS

| | | |
|---|---|---|
| DE | 41 15 475 A1 | 11/1992 |
| JP | 57167878 A * | 10/1982 |
| JP | 62026170 A * | 2/1987 |

(Continued)

OTHER PUBLICATIONS

Chinese Office Action dated Oct. 26, 2010 in corresponding Chinese Application No. 200780042226.6 (with English Translation).

(Continued)

*Primary Examiner* — Paul N Dickson
*Assistant Examiner* — Laura Freedman
(74) *Attorney, Agent, or Firm* — Oblon, Spivak, McClelland, Maier & Neustadt, L.L.P.

(57) ABSTRACT

A hood for a vehicle includes: a hood outer constituting a vehicle outer surface of the hood covering an engine room; a hood inner disposed on a rear face of the hood outer; an insulator for suppressing transmission of sound generated in the engine room to the outside; and an intercooler duct for guiding outer air flowing in the engine room to an intercooler. The insulator includes a through hole at least in a part of an overlap part overlapping the intercooler duct.

3 Claims, 6 Drawing Sheets

FOREIGN PATENT DOCUMENTS

| | | | | |
|---|---|---|---|---|
| JP | 02158419 A | * | 6/1990 | |
| JP | 02220979 A | * | 9/1990 | |
| JP | 03054079 A | * | 3/1991 | |
| JP | 3 78685 | | 8/1991 | |
| JP | 04276169 A | * | 10/1992 | |
| JP | 05016678 A | * | 1/1993 | |
| JP | 05039061 A | * | 2/1993 | |
| JP | 05139338 A | * | 6/1993 | |
| JP | 05155356 A | * | 6/1993 | |
| JP | 6-191292 | | 7/1994 | |
| JP | 07215075 A | * | 8/1995 | |
| JP | 08129109 A | * | 5/1996 | |
| JP | 2003 226264 | | 8/2003 | |
| JP | 2005 186851 | | 7/2005 | |
| JP | 2006159994 A | * | 6/2006 | |
| JP | 2008126729 A | * | 6/2008 | |

OTHER PUBLICATIONS

Extended European Search Report issued Aug. 30, 2010 in PCT/JP2007063982.

* cited by examiner

HOOD STRUCTURE FOR VEHICLE

TECHNICAL FIELD

The present invention relates to a hood structure for a vehicle applied to a vehicle such as a car.

BACKGROUND TECHNIQUE

In recent years, a hood for a vehicle such as a car is required to assure collision safety for a pedestrian and the like. For example, to assure safety of the head of a pedestrian at the time of collision, it is internationally requested to set head injury criteria (HIC) to be equal to or less than a reference value.

The head injury criteria are obtained by a pedestrian head safety test. The pedestrian head safety test is carried out by discharging dummies (head impactors) imitating the heads of a child and an adult from a collision apparatus to a hood to be tested, measuring the impact of the head impactors, and obtaining head injury criteria.

Figure 6:
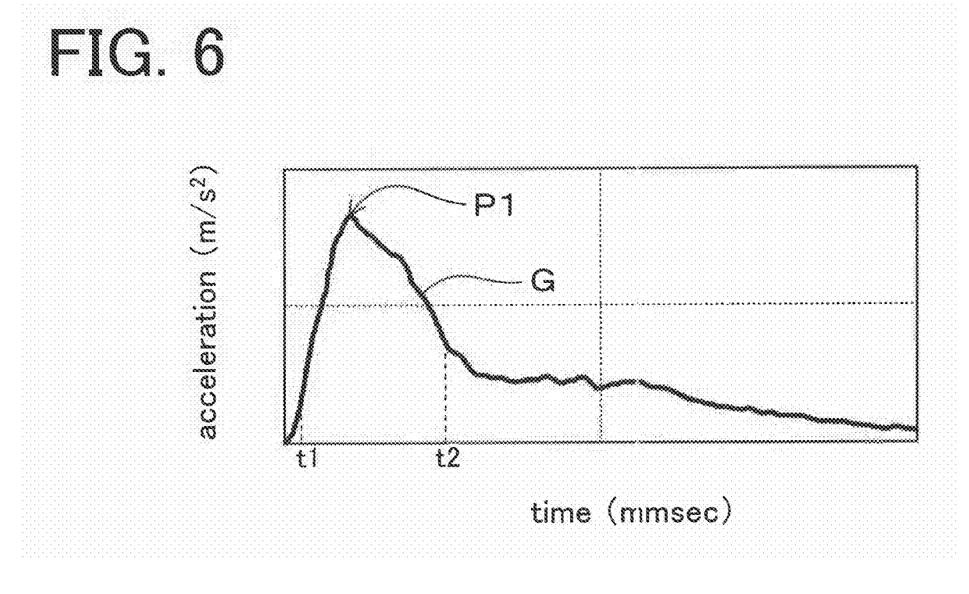
FIG. 6 is an explanatory diagram showing an example of a result of a pedestrian head safety test.

FIG. 6 shows an example of the result of the pedestrian head safety test. The diagram shows the relation between acceleration of the head impactor when the head impactor collides with a hood (hereinbelow, simply called acceleration) and time. Head injury criteria are obtained by integrating a curve G indicated by the relation of the acceleration and time (for details, refer to an embodiment to be described later).

As shown in the diagram, when the head impactor collides with the hood, the primary peak (primary peak P1) of acceleration of the head impactor appears. Since the head injury criteria are obtained by integrating the curve G indicated by the relation between acceleration and time as described above, when the primary peak P1 is high, the head injury criteria are also high.

For example, there is a hood covering and protecting an engine room of a car, having a structure that an insulator for suppressing transmission of sound generated in the engine room to the outside, a duct connected to an intercooler, and the like are disposed. In such a structure, a hood for use in a vehicle such as an SUV is larger than that of a passenger car or a 1-box car. If the hood is made of the same material, the mass of the entire hood is large and there is tendency that rigidity also becomes higher.

When the mass of the entire hood becomes large and rigidity becomes high, the primary peak in the pedestrian head safety test becomes high, and a problem accordingly occurs such that the head injury criteria become high. Consequently, a large hood is particularly requested to lower the head injury criteria.

To lower the head injury criteria, the primary peak has to be lowered. Although the structure of a vehicle body panel for lowering a secondary peak after a primary peak is proposed (refer to Patent Document 1), the structure of a hood capable of effectively lower a primary peak with a simple structure is not proposed.

Patent document 1: JP 2003-226264 Unexamined Patent Publication (Kokai)

DISCLOSURE OF THE INVENTION

Problems to be Solved by the Invention

The present invention has been accomplished in view of the conventional problems and its object is to provide a hood structure for a vehicle, capable of effectively reducing head injury criteria (HIC) in a large-size hood with a simple structure.

Means for Solving the Problems

The present invention provides a hood structure for a vehicle, including: a hood outer constituting a vehicle outer surface of a hood covering an engine room; a hood inner disposed on rear face of the hood outer; an insulator for suppressing transmission of sound generated in the engine room to the outside; and an intercooler duct for guiding outer air flowing in the engine room to an intercooler, wherein the insulator has a through hole at least in a part of an overlap part overlapping the intercooler duct.

In the hood structure for a vehicle of the present invention, as described above, the hood outer, the hood inner, the insulator, and the intercooler duct (hereinbelow, properly, simply called duct) are disposed. The insulator has the overlap part in a part overlapping the duct. In at least a part of the overlapping part, a through hole penetrating the insulator is formed. That is, the insulator can be cut only by the amount of formation of the through hole, so that the weight of the insulator can be reduced. As a result, the mass of the entire hood including the insulator can be reduced.

Further, it should be particularly noted in the present invention that the through hole is formed in the overlap part where the insulator and the duct overlap with each other. Specifically, in the part where the duct is disposed in the hood, the space which can be assured between the hood and an internal member such as the engine is reduced only by the amount of space necessary for the duct. When a pedestrian or the like collides, the entire hood is deformed, and a space (deformation region) for absorbing collision energy cannot be sufficiently assured. In the present invention, the through hole is formed in such a part.

Consequently, weight of the insulator can be reduced and, in addition, the deformation region in the hood in the part where the duct is disposed can be sufficiently assured. When a pedestrian or the like collides, the hood becomes deformed, and the collision energy can be sufficiently absorbed. In such a manner, the mass of the entire hood can be reduced and, at the same time, the rigidity of the entire hood can be effectively lowered.

Therefore, by applying the hood having the above-described structure realizing reduction in mass and reduction in rigidity, the primary peak in the pedestrian head safety test can be lowered. In association with this, the head injury criteria can be also lowered.

A large-sized hood used for an SUV of a car has larger mass and higher rigidity as compared with a small-sized hood. Consequently, there is tendency that the primary peak in the pedestrian head safety test and the head injury criteria become particularly high. By applying a hood for vehicle having the above-described structure as a large-sized hood, the effect can be produced particularly effectively.

Since the effect can be achieved by forming the through hole in the overlap part in the insulator, there is an advantage that a large design change or the like in the hood is unnecessary.

The through hole is formed in the overlap part overlapping the duct. Consequently, in the part in which the through hole is formed, the role of the insulator of suppressing transmission of the sound generated in the engine room to the outside is played by the duct disposed so as to overlap the through hole. Therefore, even in the case of applying the structure, transmission of the sound generated in the engine room to the outside can be sufficiently suppressed.

From the above, in the hood structure for a vehicle of the present invention, by reducing the weight of the insulator, the head injury criteria (HIC), particularly, in a large-sized hood can be effectively reduced with the simple structure.

BEST MODE FOR CARRYING OUT THE INVENTION

In the present invention, the through hole may be formed in one place or more places in the overlap part of the insulator.

The size, shape, and the like of the through hole are not particularly limited as long as the strength of the insulator can be sufficiently assured.

To assure the strength of the insulator, a reinforcement member or the like can be provided across the through holes. A reinforcement part or the like formed by leaving the insulator without cutting the insulator may be provided across the through holes.

It is preferable that in the overlap part of the insulator, a thin recess part recessed along an outer shape of the intercooler duct is formed, and at least a part of the intercooler duct is housed in the thin recess part.

In this case, the weight of the insulator and the space in the hood can be reduced.

It is preferable that the insulator contains glass wool.

Specifically, since the weight of glass wool is relatively heavy, the effect of providing the through hole is large.

As the material of the insulator, not only the above-described glass wool but also rigid urethane foam, melamine resin foam, or the like can be used.

Embodiment

A hood structure for a vehicle as an embodiment of the present invention will be described with reference to the drawings.

A hood 1 of the embodiment has, as shown in FIGS. 1 to 4, a hood outer 2 constituting a vehicle outer surface of the hood 1 covering an engine room 6, a hood inner 3 disposed on the rear face of the hood outer 2, an insulator 4 for suppressing transmission of sound generated in the engine room 6 to the outside, and an intercooler duct 5 for guiding outer air flowing in the engine room 6 to an intercooler (not shown).

Figure 2:
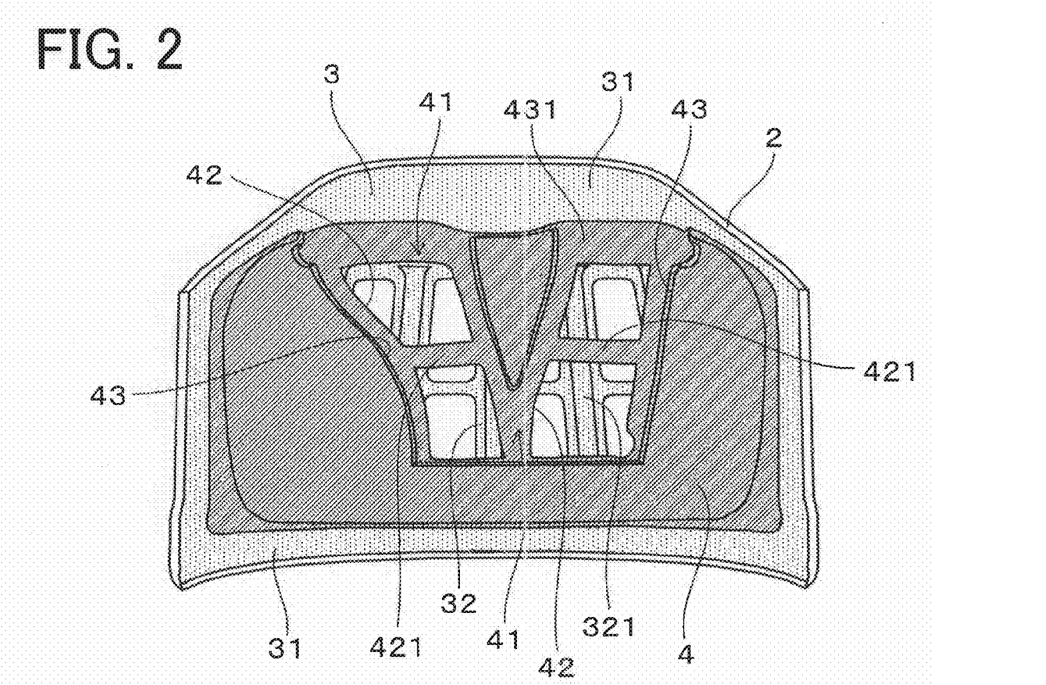
FIG. 2 is an explanatory diagram showing a state where an insulator is assembled, in the embodiment.

The insulator 4 has a through hole 42 in a part of an overlap part 41 overlapping the intercooler duct 5.

This will be described in detail below.

As shown in FIGS. 1 to 4, the hood 1 of the embodiment is applied to a hood for covering and protecting the engine room 6 of a car (SUV), and has a structure in which the hood inner 3, the insulator 4, and the intercooler duct 5 are disposed in order between the hood outer 2 constituting the vehicle outer surface of the hood 1 and an internal member such as an engine 61.

Figure 1:
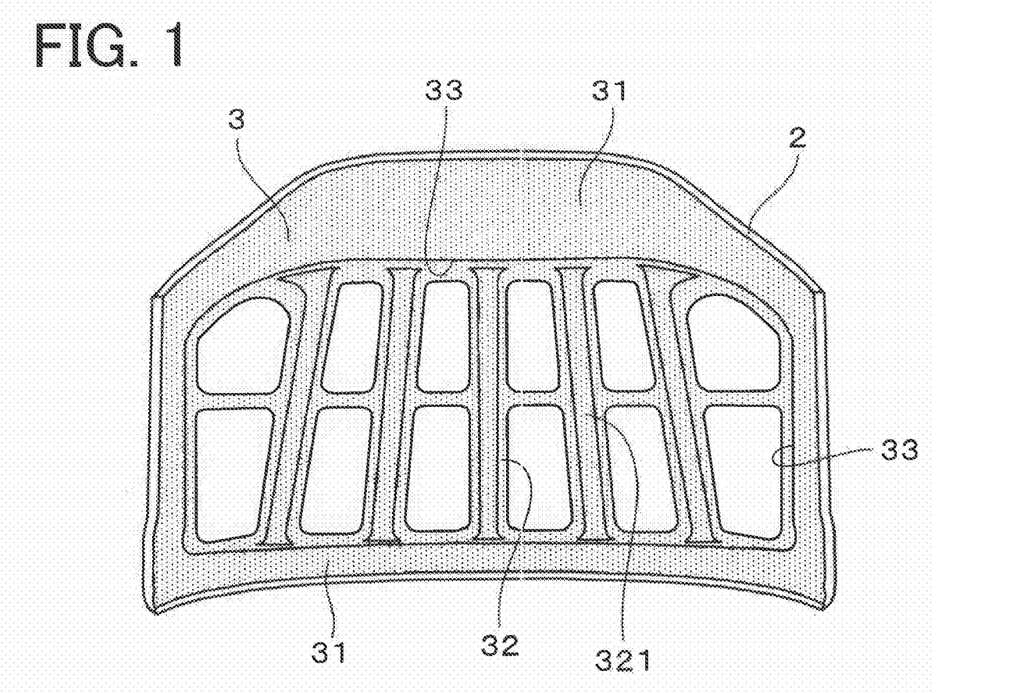
FIG. 1 is an explanatory diagram showing a hood outer and a hood inner in an embodiment.

As shown in FIG. 1, the hood inner 3 has an outer frame 31 disposed along the rear face of the outer peripheral end of the hood outer 2, and an inner frame 32 provided across the outer frames 31. A plurality of inner frames 32 are provided so as to cross the outer frames 31. Some of the inner frames 32 have projections 321, and each of the inner frames 32 has a projected shape in cross section (refer to FIG. 4).

In a region surrounded by the outer frames 31, an assembly recess 33 having a shape recessed from the outer frames 31 toward the hood outer 2 side by the entire inner frames 32 and for assembling the insulator 4 is formed.

As shown in FIG. 2, the insulator 4 has the overlap part 41 in a part overlapping the intercooler duct 5 at the time of assembly.

Figure 4:
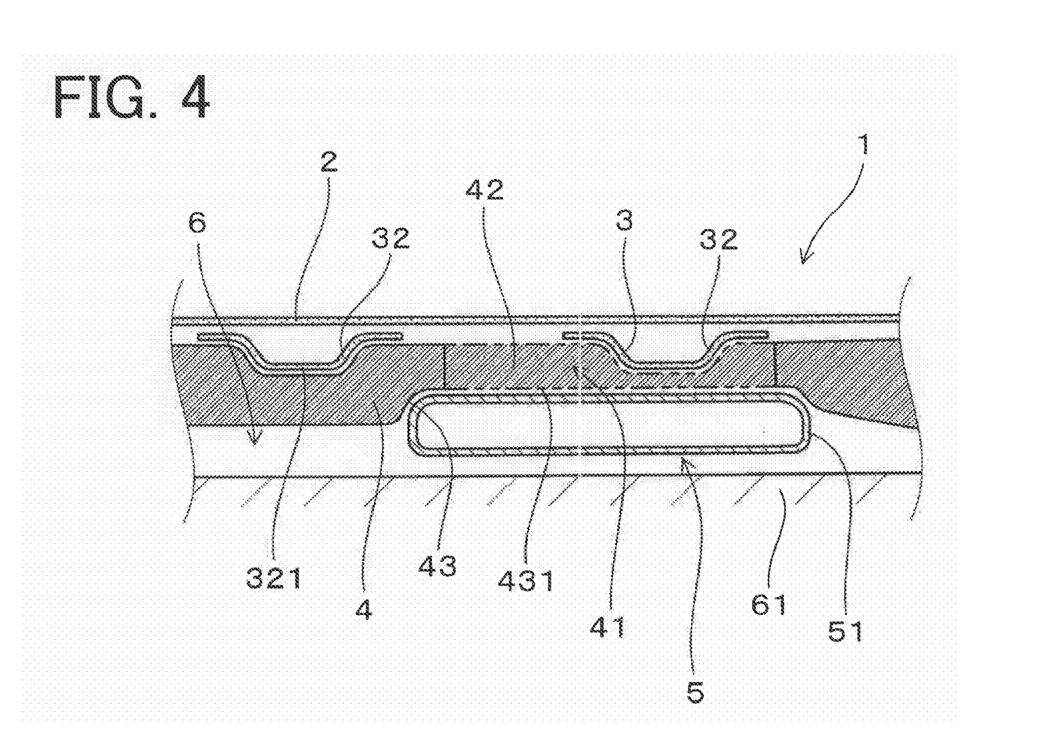
FIG. 4 is a cross section diagram taken along line A-A of FIG. 3.

As shown in FIGS. 2 and 4, in the overlap part 41, a thin recess part 43 is formed, having a shape recessed so as to match with the outer shape of the intercooler duct 5. At the time of assembly, a part of the intercooler duct 5 is housed in the thin recess part 43.

As shown in FIGS. 2 and 4, in the overlap part 41, four through holes 42 are formed so as to penetrate the insulator 4 from bottom face 431 of the thin recess part 43.

In the embodiment, as shown in FIG. 2, in the overlap part 41, the two through holes 42 are formed in each of parts overlapping branch ducts 51 and 52 which constitute the intercooler duct 5 and will be described later.

Between the through holes 42, to assure intensity of the insulator 4, a through hole 42 is not formed but a reinforcement part 421 formed by leaving the insulator 4 without cutting the insulator 4 is provided.

As shown in FIG. 2, the insulator 4 is disposed in the assembly recess 33 formed by the inner frames 32 of the hood inner 3 at the time of assembly.

The insulator 4 of the embodiment is of a mold type which has a two-layer structure of a glass wool layer and a non-woven layer and is molded in a predetermined shape.

Figure 3:
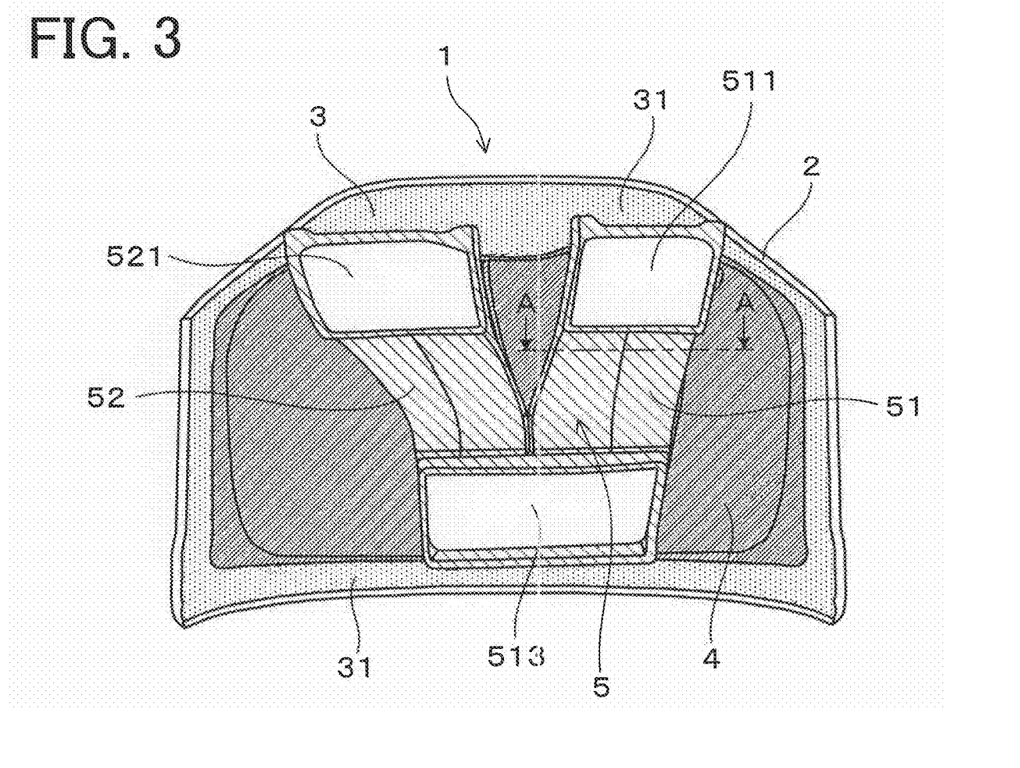
FIG. 3 is an explanatory diagram showing a state where an intercooler duct is assembled, in the embodiment.

As shown in FIG. 3, as described above, the intercooler duct 5 guides outside air flowing in the engine room 6 and supplies it to the intercooler (not shown). The intercooler duct 5 has two cylindrical branch ducts 51 and 52 for distributing the outside air to the intercooler. The intercooler duct 5 has duct openings 511 and 512 in the branch ducts 51 and 52, respectively, and also has a combined opening 513 obtained by combining the branch ducts 51 and 52. The combined opening 513 is connected to the intercooler.

As shown in FIGS. 3 and 4, the intercooler duct 5 is disposed so that a part of the branch ducts 51 and 52 is housed in the thin recess part 43 at the time of assembly.

Next, the operation and effect of the hood structure of the embodiment will be described.

In the structure of the hood 1 of the embodiment, the insulator 4 has the overlap part 41 in a part overlapping the intercooler duct 5. In a part of the overlapping part 41, the through hole 42 penetrating the insulator 4 is formed. That is, the insulator 4 can be cut only by the amount of formation of the through hole 42, and the weight of the insulator 4 can be reduced. As a result, the mass of the entire hood 1 including the insulator 4 can be reduced.

Further, in the embodiment, the through hole 42 is formed in the overlap part 41 where the insulator 4 and the intercooler duct 5 overlap with each other. That is, the though hole 42 is formed in the part where the intercooler duct 5 is disposed in the hood 1, that is, the part where a space (deformation region) for absorbing collision energy cannot be sufficiently assured when a pedestrian or the like collides and the entire hood 1 becomes deformed.

Consequently, weight of the insulator 4 can be reduced and, in addition, the deformation region in the hood 1 in the part where the intercooler duct 5 is disposed can be sufficiently assured. When a pedestrian or the like collides, the hood 1 becomes deformed, and the collision energy can be sufficiently absorbed. In such a manner, the mass of the entire hood 1 can be reduced and, at the same time, the rigidity of the entire hood 1 can be effectively lowered.

Therefore, by applying the hood 1 having the structure realizing reduction in mass and reduction in rigidity, the primary peak in the pedestrian head safety test which will be described later can be lowered. In association with this, the head injury criteria can be also lowered.

A large-sized hood 1 used for an SUV of a car has larger mass and higher rigidity as compared with a small-sized hood 1. Consequently, there is tendency that the primary peak in the pedestrian head safety test and the head injury criteria become particularly high. By applying the hood 1 having the above-described structure, the effect can be produced particularly effectively.

Since the effect can be achieved by forming the through hole 42 in the overlap part 41 in the insulator 4, there is an advantage that a large design change or the like in the hood 1 is unnecessary.

The through hole 42 is formed in the overlap part 41 overlapping the intercooler duct 5. Consequently, in the part in which the through hole 42 is formed, the role of the insulator 4 of suppressing transmission of the sound generated in the engine room 6 to the outside is played by the intercooler duct 5 disposed so as to overlap the through hole 42. Therefore, even in the case of applying the structure, transmission of the sound generated in the engine room 6 to the outside can be sufficiently suppressed.

Next, an experiment example expressing the operation and effect of the hood structure of the embodiment will be described.

In the example, the hood 1 (the product of the present invention) of the embodiment in which the through hole 42 is provided in the overlap part 41 of the insulator 4 was prepared. As a comparison, a conventional hood (a conventional product) in which a through hole is not provided in an insulator was prepared. The pedestrian head safety test was conducted for each of the hoods, and the head injury criteria (HIC) were obtained.

The hood used in the example is of a large size applied to an SUV.

Figure 5:
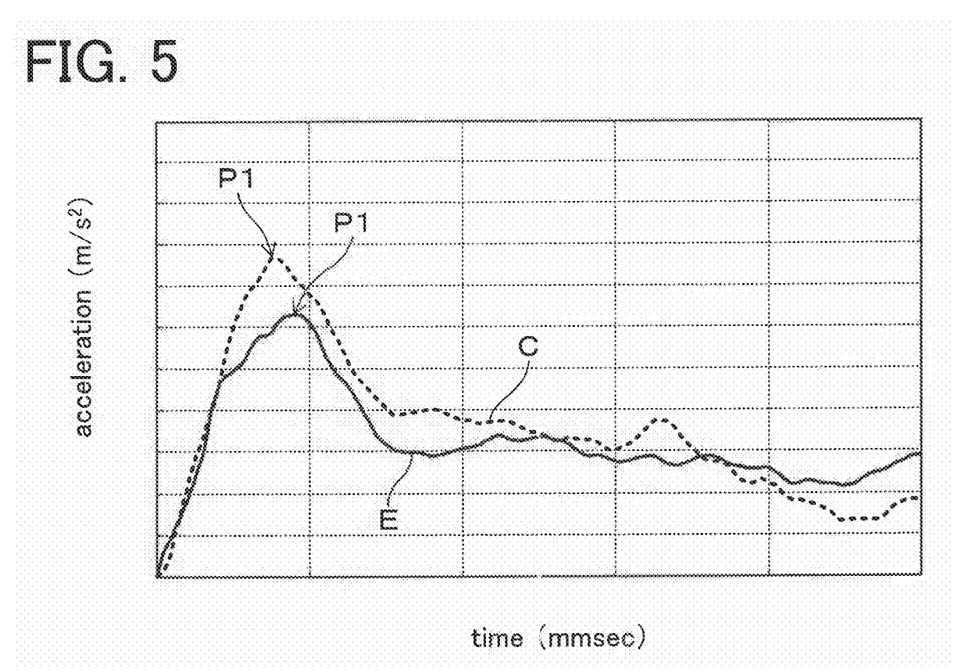
FIG. 5 is an explanatory diagram showing a result of a pedestrian head safety test, in the embodiment.

FIG. 5 shows a test result by domestic assessment. The diagram shows the relation between the acceleration of the head impactor and time. The acceleration denotes deceleration of the axial force of the head impactor.

The product of the present invention (curve E) and the conventional product (curve C) are compared with each other using the diagram. A primary peak P1 appearing when the head impactor collides with the hood of the present invention is lower in comparison with the conventional product. It is considered that the phenomenon occurs due to decrease in mass and reduction in rigidity of the hood of the present invention as a whole.

Next, from the test result of FIG. 5, the head injury criteria (HIC) are obtained.

With reference to FIG. 6 showing an example of the result of the pedestrian head safety test, the head injury criteria (HIC) can be obtained by selecting arbitrary time (t1 to t2) in a curve G expressed by the relation between acceleration and time and integrating by using the following equation.

$$HIC = (t2-t1)\left\{\frac{1}{t2-t2}\int_{t1}^{t2} G(t)\,dt\right\}^{2.5} \qquad \text{Equation (1)}$$

The head injury criteria (HIC) of the product of the present invention and the conventional product were obtained by the above equation from the test results (curves E and C) of FIG. 5. In association with decrease in the primary peak P1, the head injury criteria (HIC) of the product of the present invention could be decreased by about 10% as compared with those of the conventional product.

The invention claimed is:

1. A hood structure for a vehicle, comprising:
   a hood outer panel constituting a vehicle outer surface of a hood covering an engine room;
   a hood inner member disposed at an inner face of the hood outer panel;
   an insulator provided at an inner side of said hood outer panel for suppressing transmission of sound generated in the engine room to the outside of said hood; and
   an intercooler duct provided at an inner side of said hood outer panel and at an inner side of said insulator for guiding outer air flowing in the engine room to an intercooler, whereby an overlap part of said insulator is provided where both said insulator and said intercooler duct are provided at an inner side of said hood outer panel, and
   wherein the insulator has a through hole in at least in a part of said overlap part.

2. The hood structure for a vehicle according to claim 1, wherein in the overlap part of the insulator, a thin recess part recessed along an outer shape of the intercooler duct is formed, and at least a part of the intercooler duct is housed in the thin recess part.

3. The hood structure for a vehicle according to claim 1, wherein the through hole is covered, at in inner side thereof, by said intercooler duct.

* * * * *